United States Patent
Zenzen et al.

(10) Patent No.: US 12,516,705 B2
(45) Date of Patent: Jan. 6, 2026

(54) BRAKE CALIPER WITH COVER

(71) Applicant: ZF Active Safety GmbH, Koblenz (DE)

(72) Inventors: Guido Zenzen, Macken (DE); Philipp Schwenzer, Urmitz (DE); Marco Becker, Oberduerenbach (DE); Florian Roessinger, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 644 days.

(21) Appl. No.: 17/869,059

(22) Filed: Jul. 20, 2022

(65) Prior Publication Data

US 2023/0034957 A1 Feb. 2, 2023

(30) Foreign Application Priority Data

Apr. 26, 2022 (DE) .......................... 102022110050.2

(51) Int. Cl.
 *F16D 55/226* (2006.01)
 *F16D 65/12* (2006.01)

(52) U.S. Cl.
 CPC .......... *F16D 55/226* (2013.01); *F16D 65/12* (2013.01)

(58) Field of Classification Search
 CPC ........ F16D 55/226; F16D 55/22; F16D 65/12; F16D 65/0068; F16D 65/0081;
 (Continued)

(56) References Cited

U.S. PATENT DOCUMENTS 4,123,090 A * 10/1978 Kotsakis ............. F16L 37/0915
 285/39
4,586,734 A * 5/1986 Grenier ............... F16L 37/0915
 285/39

(Continued)

FOREIGN PATENT DOCUMENTS

DE 1193736 B 5/1965
DE 19725478 A1 12/1998
(Continued)

OTHER PUBLICATIONS

English machined translation of DE 102006033240, Mar. 24, 2016.*
JP-2016099422-a, English machined translation, May 30, 2016.*

*Primary Examiner* — Robert A. Siconolfi
*Assistant Examiner* — San M Aung
(74) *Attorney, Agent, or Firm* — Kristin L. Murphy (57) ABSTRACT

The present disclosure relates to a brake calliper for a disc brake. The brake calliper comprises a supporting structure, a cover with a pin, and a fixing disc. The supporting structure has a bridge and at least one bridge finger which has a brake lining side, an outer side and a bore which is incorporated into the outer side and which runs from the outer side in the direction of the brake lining side. The cover has a pin protruding into the bore. The fixing disc has a disc edge which has an outer diameter D and which is positively held in the bore and with a disc center which has a through-opening, through which the pin protrudes. The disc center has a clamping region which is bulged relative to the disc edge in the direction of the brake lining side and which fixedly clamps the pin in the through-opening by a clamping edge. The disclosure also relates to such a fixing disc itself.

17 Claims, 4 Drawing Sheets

(58) Field of Classification Search
CPC .. F16D 65/0075; F16D 65/183; F16D 65/092; F16D 65/095; F16D 55/0016; F16D 55/0037; F16D 55/002
USPC ..................................................... 188/73.45
See application file for complete search history.

(56) References Cited

U.S. PATENT DOCUMENTS

| | | | | |
|---|---|---|---|---|
| 4,593,943 | A | * | 6/1986 | Hama ................. F16L 37/0915 285/308 |
| 4,951,975 | A | * | 8/1990 | Bartholomew ..... F16L 37/0982 285/308 |
| 2015/0122598 | A1 | * | 5/2015 | Lethorn .............. F16D 65/0087 384/37 |
| 2018/0231076 | A1 | * | 8/2018 | Choi ................... F16D 65/0006 |

FOREIGN PATENT DOCUMENTS

| | | | | |
|---|---|---|---|---|
| DE | 102004048436 A1 | * | 4/2006 | ............ F16B 21/075 |
| DE | 102006033240 A1 | * | 1/2008 | ............... G09F 7/06 |
| DE | 102013010161 A1 | | 12/2014 | |
| DE | 102013020750 A1 | | 6/2015 | |
| DE | 102006033240 B4 | | 3/2016 | |
| DE | 102018221931 A1 | | 6/2020 | |
| EP | 1441134 A1 | | 7/2004 | |
| FR | 2712063 A1 | * | 5/1995 | .......... F16L 37/0982 |
| FR | 3045750 B1 | * | 5/2019 | .......... F16D 55/226 |
| GB | 1555640 A | * | 11/1979 | .......... F16L 37/0915 |
| JP | 5332014 B2 | * | 11/2013 | |
| JP | 2016099422 A | * | 5/2016 | |
| WO | 2017102997 A1 | | 6/2017 | |
| WO | WO-2020128228 A1 | * | 6/2020 | ............. F16D 55/22 |
| WO | WO-2021125052 A1 | * | 6/2021 | .......... F16D 55/226 |

\* cited by examiner

BRAKE CALIPER WITH COVER

CROSS-REFERENCE TO RELATED APPLICATION

This application claims priority to German Patent Application No. 102021119548.9, filed Jul. 28, 2021, and German Patent Application No. 102022110050.2, filed Apr. 26, 2022, the disclosure of each incorporated herein by reference in its entirety.

TECHNICAL FIELD

The disclosure relates to a brake calliper for a disc brake with a cover which is fastened to a supporting structure of the brake calliper, for example to a bridge finger or bridge fingers of the supporting structure. The disclosure also relates to a fixing disc for such a brake calliper.

BACKGROUND

Disc brakes are widely used as wheel brakes in vehicles. According to wheel design, parts of the disc brake are frequently visible therethrough. When using floating calliper disc brakes, in this case a part of the floating calliper and in turn a part of the bridge and the bridge fingers are visible through the wheel structure. The bridge fingers or optionally intermediate spaces between the bridge fingers may be covered by a cover, also called a logo plate, which is mounted on the brake calliper, for example on the bridge fingers. Such a cover fulfils protective functions (for example protection against dust) and provides a surface for a label or a logo, for example a company logo.

Various solutions for fastening such a cover to a brake calliper are known from the prior art.

DE 102006033240B4 discloses a screwless fastening of a (cast) company emblem to a brake calliper.

In DE 102013020750A1 it is disclosed that the fastening of an identifying part may be carried out by a pin-shaped projection which is exclusively fixed by frictional forces.

DE 102018221931A1 discloses a brake calliper with a cover fastened to a base body.

SUMMARY

Accordingly, what is needed is a fastening solution for a brake calliper of the type described in the introduction, in which the cover is securely and permanently held and is able to be mounted in a simple manner.

According to a first aspect of the disclosure, a brake calliper for a disc brake is disclosed.

The first aspect of the disclosure relates to the brake calliper. The brake calliper according to the disclosure for a disc brake comprises a supporting structure with a bridge and at least one bridge finger which has a brake lining side, an outer side and a bore which is incorporated into the outer side and which runs from the outer side in the direction of the brake lining side. Moreover, the brake calliper comprises a cover with a pin protruding into the bore and a fixing disc with a disc edge which has an outer diameter and which is positively held in the bore and with a disc centre which has a through-opening through which the pin protrudes. In one exemplary arrangement, the through-opening is of circular configuration. The disc center has a clamping region which is bulged relative to the disc edge in the direction of the brake lining side and which fixedly clamps the pin in the through-opening by a clamping edge. In one exemplary arrangement, the clamping edge has a circular profile. The bulging firstly causes the pin to be able to be pushed more easily through the through-opening of the fixing disc during the mounting of the cover on the brake calliper, and secondly causes the clamping region with the clamping edge to counteract an undesired slippage of the pin from the bore. A circular profile of the clamping edge makes available a favourable contact profile between clamping edge and pin. That is to say, the clamping edge does not just clamp against the pin at certain points, and instead it has a profile that corresponds at least in part to the pin circumferential surface. The bulging additionally gives the fixing disc stability. By the positive connection between the fixing disc and the bore, the fixing disc is held in the bore against release in the axial direction along the bore longitudinal axis. Thus the cover is also securely held on the supporting structure.

In one exemplary arrangement, the positive connection between the fixing disc and the bore is achieved by the bore having a groove, in particular an annular groove, in which the disc edge engages.

According to a further exemplary arrangement, the bore has between the outer side and the groove a portion in which the bore tapers in the direction of the brake lining side. In one exemplary arrangement, the tapering has a conical shape. Due to this design, an advantageous mounting situation is produced in order to bring the fixing disc into the latching position in the groove. This may be carried out, for example, in such a manner that the fixing disc is forced into the groove by a mounting mandrel via the tapering bore portion and the disc edge latches in the groove.

Alternatively, or additionally to the aforementioned tapering bore portion, the bore may have between the groove and the brake lining side a portion in which the bore tapers in the direction of the brake lining side. A conical shape may also be cited here as a suitable tapering path.

Such a tapering protects the fixing disc from the clamping region bending back excessively, or from slipping through in the direction of the brake lining side during mounting.

Moreover, it is advantageous if the bore in the portion between the outer side and the groove has a cylindrical bore portion which is arranged between the aforementioned tapering and the groove. In one exemplary arrangement, the axial extent of the cylindrical bore portion is smaller than or equal to the axial extent of the tapering.

The cylindrical bore portion ensures a sufficient strength of the groove wall, which has to provide the required retention counter to the pull-out direction of the pin from the bore. By the cylindrical bore portion it is ensured that the relevant groove wall is not weakened in its support surface due to production tolerances. A cylindrical bore portion having an axial extent which is too great would in turn impede the mounting.

Regarding the tapering which is located in the bore portion between the groove and the brake lining side, however, it is advantageous if this tapering directly adjoins the groove in order to achieve advantageously the above-described protection from the bulged clamping region bending back excessively, or from the fixing disc slipping through in the direction of the brake lining side during mounting.

In one exemplary arrangement, the fixing disc is designed as follows: the disc edge has an outer diameter D. The fixing disc has a material thickness t which extends from a first side to a second side of the fixing disc and the fixing disc has a height H which is larger than the material thickness t due to the bulged clamping region. Such a shape may be ideally produced by a deep-drawing method from a corresponding sheet metal blank. In one exemplary arrangement, the fixing disc is produced in this way.

The bulged clamping region has the shape of a hollow truncated cone, wherein, in a non-mounted state of the fixing disc, the cone opening angle α is between 100° and 140°. In one exemplary arrangement, the cone opening angle α is between 110° and 130°.

This design results in the clamping region exerting an effective clamping action on the pin in the mounted state and/or the clamping edge even being able to be pressed into the pin surface. Since in the mounted state the cone opening angle is dependent on the geometry of the bore and the pin, the aforementioned angular ranges refer to the fixing disc in a non-mounted state.

In one exemplary arrangement, the fixing disc edge is configured in an annular manner between the outer diameter D and the bulged clamping region with a height HRing which is equal to the material thickness t. Thus the disc edge has a defined, constant height, a dimensioning of the corresponding positive connection receiver in the bore, in particular a groove, which corresponds thereto being quite possible.

In one exemplary arrangement, at least one incision running from the through-opening in a direction of the disc edge runs into the bulged clamping region. Along the clamping edge, the incision forms an interruption portion which extends over an angle δ and a clamping edge portion which extends over an angle γ. It is clear that the clamping edge is interrupted in the interruption portion and that in this portion there is no direct contact between the damping edge and the pin. By contrast, the clamping edge present in the clamping edge portion clamps against the pin. The at least one incision runs radially outwards. The radial profile refers to the central point M of the fixing disc. The incision does not cut through the fixing disc in the outer region. That is to say, the incision is located in the bulged clamping region. The angle γ is greater than the angle δ. The angle γ may be at least twice as great as the angle δ. In a further exemplary arrangement, the angle γ is at least three times greater than the angle δ. The greater clamping edge proportions result in a particularly secure hold for the cover. Despite interruption (s), a high proportion of clamping of the clamping edge is thus obtained circumferentially around the pin. The indicated angles γ and δ each have their vertex lying congruently on the central point of the fixing disc.

In accordance with the above-described configuration of the at least one incision, it may be preferable for a plurality of incisions to be provided and therefore accordingly a plurality of interruption portions and clamping edge portions.

In one exemplary arrangement, the fixing disc has five incisions and therefore accordingly five interruption portions and five clamping edge portions.

In a design with a plurality of incisions, the incisions may be distributed uniformly along the clamping edge, i.e. all of the angles γ are of the same size as each other and all of the angles δ are of the same size as each other.

The incision or the incisions result in the formation of a clamping portion or a plurality of clamping portions which in each case press onto the pin with a clamping edge portion. The clamping edge portions may also press into the pin circumferential surface of the pin. The clamping portions are similar to spring legs which apply a clamping force on account of elastic deformation and thus apply a clamping force to the pin. The clamping portions are elastically deflectable at least in a defined deflection range.

The fixing disc is elastically deformable in a more flexible manner due to the incision or the incisions. This facilitates the mounting and increases the functional reliability, i.e. retention reliability, even in the case of possible production tolerances.

In one exemplary arrangement, the clamping portions are oriented such that they form in each case an angle β with the pin longitudinal axis, wherein the angular dimension of the angle β is between 45° and 70°.

These specifications relate to the state in which the fixing disc is mounted in the bore and on the pin.

Due to this orientation, the clamping portions act at an angle on the pin surface in which the clamping edge optimally presses against the pin surface and prevents a release of the pin and thus of the cover. This orientation even permits the clamping edge to press into or cut into the pin surface, similar to the manner in which a cutting wedge penetrates into a workpiece in a machining process, with the difference that in the present case it only results in the pressing-in action and no material is removed from the pin.

Starting from the through-opening, in one exemplary arrangement, the width of the incision or of the incisions decreases in the direction of the disc edge. In this way, the clamping portions become stiffer and achieve a higher clamping force.

In one exemplary arrangement, the deepest point of the incision or of the incisions has a semicircular shape. That is to say, the side flanks of the incision run tangentially into this semicircular incision base. This exemplary arrangement increases in particular the fatigue strength of the component in respect of the oscillation load in the region of the brake. This in turn favours a permanent hold. This exemplary arrangement is combined with the fact that the incision or the incisions do not extend into the whole bulge and do not completely adjoin the disc edge, and instead the deepest point of the incision or of the incisions lies within the bulge. In this way, the stiffness and therefore the secure retention of the cover is still further increased. The advantage is that, on account of good stiffness, the fixing disc does not bend in an undesired manner during assembly. Favourable assembly can thus take place.

In one exemplary arrangement, if the fixing disc has a slot cutting through the material thickness and passing through from the through-opening to the outer diameter D. In a state of the fixing disc not mounted in the bore and not mounted on the pin, the slot has a width b1 measured at the transition with the through-opening. In a state of the fixing disc mounted in the bore and mounted on the pin, the slot has a width b2 measured at the transition with the through-opening. B2 is preferably smaller than b1. In an advantageous exemplary arrangement, the slot is of wedge-shaped configuration. The slot edges of the fixing disc are oriented towards one another in a correspondingly wedge-shaped manner. In an advantageous exemplary arrangement, the slot edges run in each case radially towards the fixing disc central point M.

A simpler insertion of the fixing disc in the positive connection receiver of the bore, in particular the groove, is possible by this slot.

The slot is arranged in the region or in the profile of a clamping edge portion, as a result of which this clamping edge portion is cut through.

In one exemplary arrangement, the pin, starting from the bearing side, tapers towards the pin end in a holding region which extends over a length L2. In this holding region, the fixing disc, or the clamping edge of the fixing disc, has clamping contact with the pin in the assembled state. This tapering has the advantage that the components are easier to assemble. That is to say, the pin can thus be more easily pushed through the through-opening. Although the pin can be easily inserted first with its pin end into the through-opening, a firm fit in the final assembly position of the pin is however obtained on account of the increasing pin thickness or pin diameter. This contributes to the fact that the clamping portions are also not bent open unnecessarily wide during assembly, e.g. if the assembly takes place with a certain process speed, and instead the clamping portions are not overextended during assembly and thus have the best clamping force in the assembled end position.

The pin has a total length L1. The holding region with its length L2 has the greatest lengthwise proportion of the total length L1. In this way, the above-described assembly advantage (easy insertion of the pin end, secure retention in the holding region and avoidance of overextension of the clamping portions) can be easily achieved. In this respect, the length ratio of L2 to L1 is greater than 0.5, in one exemplary arrangement, greater than or equal to 0.6 and in a further exemplary arrangement, greater than or equal to 0.7.

In one exemplary arrangement, the tapering has a conical shape, wherein the conically extending flanks, seen in a parallel projection, enclose an angle φ. The angle φ may be greater than or equal to 1° and less than or equal to 3°.

The tapering shape is particularly suitable in connection with the relatively stiff fixing disc and with the, in relation to the incision width of the incisions, relatively wide clamping portions with their clamping edge portions, since, through the cone shape of the pin, the clamping portions are pressed apart as it were according to the wedge principle, such that a pressing-in of the pin is possible.

It is advantageous if the fixing disc is produced from austenitic, austenitic-ferritic or austenitic and hardened stainless steel or from spring steel (in a design which is not corrosion resistant). With a spring steel design, the surface is provided with a corrosion-resistant layer which serves for corrosion protection. Such a corrosion-resistant layer is designed as a zinc lamellar layer. The stated materials and coatings are suitable for achieving a component which withstands the rough conditions of use in a brake and which reliably and permanently ensures functional safety.

The material of the pin or at least its surface is softer than the material of the fixing disc or at least of the clamping edge. In this way, the clamping edge can more easily claw, cut or dig into the surface of the pin. In this way, the cover is held securely.

Naturally the fastening of the cover to the supporting structure of the brake calliper may also be carried out by means of a more than one of the above-described arrangements, comprising the bore, pin and fixing disc.

In one exemplary arrangement, the cover is integrally formed with the pin respectively with the pins. In one exemplary arrangement, the cover and the pin respectively the pins are made as one singe cast part, for example as a die-cast aluminium part.

The mounting of the components in the bore is advantageously carried out according to the following sequence: The fixing disc is positioned on a mounting mandrel and inserted into the bore until the fixing disc is in the position in which it is positively held in the bore. Alternatively, an introduction of the fixing disc without a mounting mandrel or with a different tool is also possible. In one exemplary arrangement, with a design of the positive connection as a groove, the insertion of the fixing disc by the mounting mandrel, until the fixing disc snaps into the groove with its disc edge, is preferred. Then the positioning of the cover takes place, wherein the pin or the pins are inserted into the respective bore and pressed through the through-opening of the respective fixing disc, whereby the clamping action on the pin or the pins is brought about, as already described above.

The second aspect of the disclosure relates to the fixing disc. The fixing disc according to the disclosure has already been described above. It is also repeatedly or additionally described below in the description of an exemplary arrangement. When, in connection with the fixing disc, reference is made to the brake calliper and to the parts comprised by the brake calliper, these references serve to clearly define the different elements of the fixing disc, for example to present the advantages of the different elements of the guide element in relation to the prior art.

BRIEF DESCRIPTION OF DRAWINGS

The disclosure is described in more detail hereinafter with reference to the accompanying schematic figures. In this case, it is the description of a preferred exemplary arrangement of the disclosure. For the sake of clarity, not all of the elements shown in a figure are always provided with a reference numeral. Corresponding elements or regions are thus at least identified in a different figure and the meaning may be derived therefrom.

DETAILED DESCRIPTION

Figure 1:
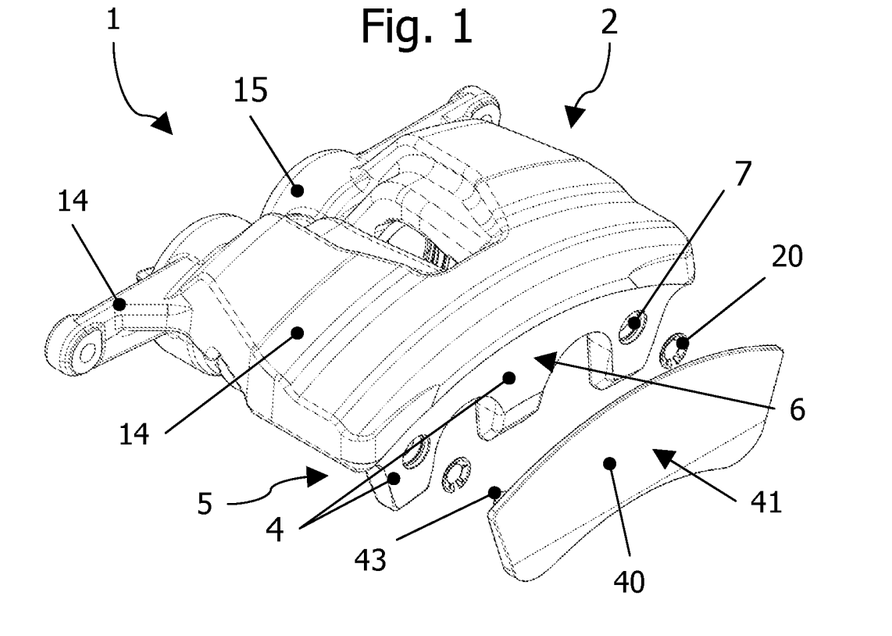
FIG. 1 shows the brake calliper with the cover and fixing discs in an exploded view.

In FIG. 1 it may be seen that the brake calliper 1 has a supporting structure 2 and a cover 40 which is fastened by two fixing discs 20 to the supporting structure 2. In one exemplary arrangement, the supporting structure 2 comprises a connecting region 14, a brake cylinder region 15, a bridge 3 protruding from the connecting region 14, and three bridge fingers 4 which adjoin the bridge 3 in a row spaced apart from one another at right-angles and oppose the brake cylinder region 15. The supporting structure is a metal cast part. The bridge fingers 4 have in each case an outer side 6 and a brake lining side 5 which oppose one another and define the bridge fingers in terms of the thickness thereof. The brake lining side 5 is the side which faces the brake cylinder region 15. The outer sides 6 also form at the same time an outer boundary of the brake calliper 1. The outer sides 6 form in the present exemplary arrangement a planar bearing surface against which the cover 40 bears with a bearing side 42 in the mounted state. This is visible, for example, in FIG. 2. After the mounting, the outer side 6 of the bridge fingers 4 is covered by the cover 40 and the visible side 41 of the cover 40 forms the closure of the calliper 1 here. The two outer bridge fingers 4 have in each case a bore 7 of identical design. The cover 40 covers all three bridge fingers 4. The cover 40 has on its bearing side 42 two integrally attached pins 43 which in each case are inserted into a bore 7 which is incorporated in each case in the outer side 6 of the two outer bridge fingers 4. In its path, each of the two bores 7 in its path into the respective bridge fingers 4 or therethrough has a bore annular groove 8 according to a third of the bridge finger thickness. In each case, a fixing disc 20 is located between the pin 43 and the respective bore 7. Since the bores 7, the fixing discs 20 and also the installed situations relative to the pin 43, the fixing disc 20 and the bore 7 are identical, the following description is made in the singular.

The fixing disc 20 has a circular outer contour with an outer diameter D. Moreover, the fixing disc has a disc edge 21 which has a ring width BRing running radially inwardly in an annular manner starting from the outer diameter D. The disc edge 21 is of planar configuration and its height HRing is equal to a material thickness t of the fixing disc 20. A disc center 22 has a clamping region 26 which is bulged relative to the disc edge 21 so that the overall height H of the fixing disc 20 is larger than the material thickness t. The bulging 26 has the shape of a hollow truncated cone, wherein the cone opening angle $\alpha$ is, in one exemplary arrangement, 122°. The angle $\alpha$ may however also have another value, for example between 100° and 140° and in one exemplary arrangement, between 110° and 130°. This angular dimension is present in a state of the fixing disc 20 neither inserted into the bore 7 nor positioned on the pin 43, i.e. in a state in which the fixing disc 20 is not deformed by an installation. A circular through-opening 25 which forms a circumferential clamping edge 27 is located in the disc center 22.

A plurality of incisions 29 are present, starting from the through-opening 25 and running radially in the direction of the disc edge 21. These incisions 29 are arranged spaced apart from one another and distributed uniformly along the clamping edge 27. The incisions 29 in each case cut into the bulged clamping region 26 and subdivide the clamping edge 27 into a plurality of interruption portions 34, in which the clamping edge 27 is interrupted or recessed, and into a plurality of clamping edge portions 28 and correspondingly form a plurality of clamping portions 30.

Figure 11:
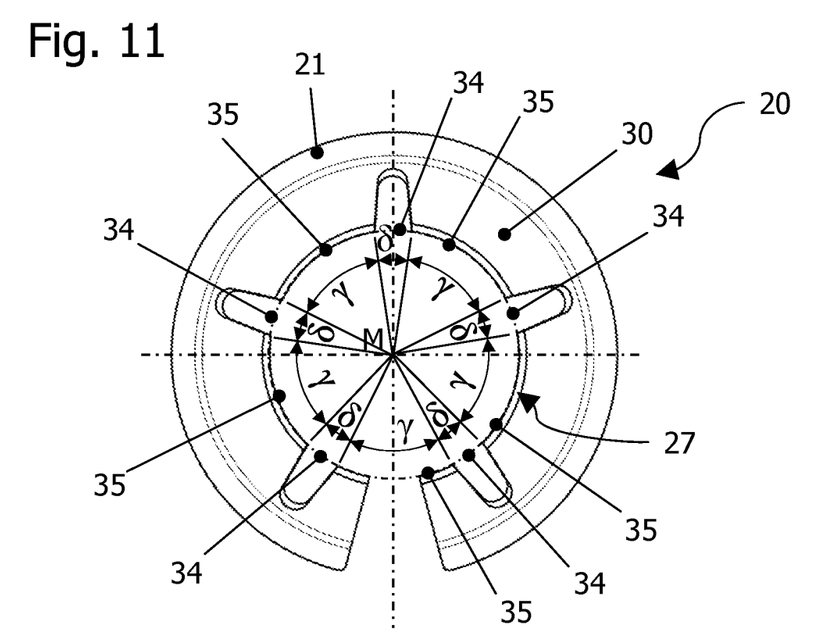
FIG. 11 shows the fixing disc in an enlarged two-dimensional projected view.

The interruption portions 34 each extend over an angle $\delta$, and the clamping edge portions 28 each extend over an angle $\gamma$. In the assembled state, the clamping edge portions 28 press the clamping edge 27 present there against the pin 43. The incisions 29 run radially outwards with respect to the central point M of the fixing disc. The incisions 29 in each case do not cut through the fixing disc 20 in the outer region. They do not run as far as the disc edge 21. That is to say, the incisions 29 are located within the bulged clamping region 26.

In one exemplary arrangement, the angle $\gamma$ is approximately three times greater than the angle $\delta$. However, other size ratios are also possible. The angle $\gamma$ is at least twice as great as the angle $\delta$. In one exemplary arrangement, the angle $\gamma$ is at least three times greater than the angle $\delta$. The greater clamping edge proportions result in a particularly secure hold for the cover 40. Despite the interruptions, a high proportion of clamping clamping edge 27 with the clamping edge portions 28 is thus obtained circumferentially around the pin 43. The indicated angles $\gamma$ and $\delta$ each have their vertex lying congruently on the central point M of the fixing disc 20. In the present exemplary arrangement, five incisions 29 are distributed uniformly over 360°.

The incisions 29 result in the formation of a plurality of clamping portions 30 which each press with a clamping edge portion 28 onto the pin 43 or press into the pin circumferential surface 44 of the pin 43. The clamping portions 30 are similar to spring legs which apply a clamping force on account of elastic deformation and thus apply a clamping force to the pin 43. The clamping portions 30 are elastically deflectable at least in a defined deflection range.

The fixing disc 20 is elastically deformable in a more flexible manner due to the incisions 29. This facilitates the assembly and increases the functional reliability, even in the case of possible production tolerances.

Starting from the through-opening 25, the width of the incisions 29 decreases in each case in the direction of the disc edge 21. In this way, the clamping portions 30 become stiffer and achieve a higher clamping force. The deepest point of the incisions 29 has in each case a semicircular shape. That is to say, the side flanks of the incisions 29 each run tangentially into the semicircular incision base. This exemplary arrangement increases in particular the fatigue strength of the component in respect of the oscillation load in the region of the brake. This in turn favours a permanent hold. This exemplary arrangement thus has the combined effect that the incisions do not extend into the whole bulge 26 and do not completely adjoin the disc edge 21, and instead the deepest point of the incisions 29 in each case lies within the bulge 26 and, in this way, the stiffness and therefore the secure retention of the cover 40 are still further increased. This also has the advantage that, on account of good stiffness, the fixing disc 20 does not bend in an undesired manner during assembly. Favourable assembly can thus take place.

Figures 7, 8:
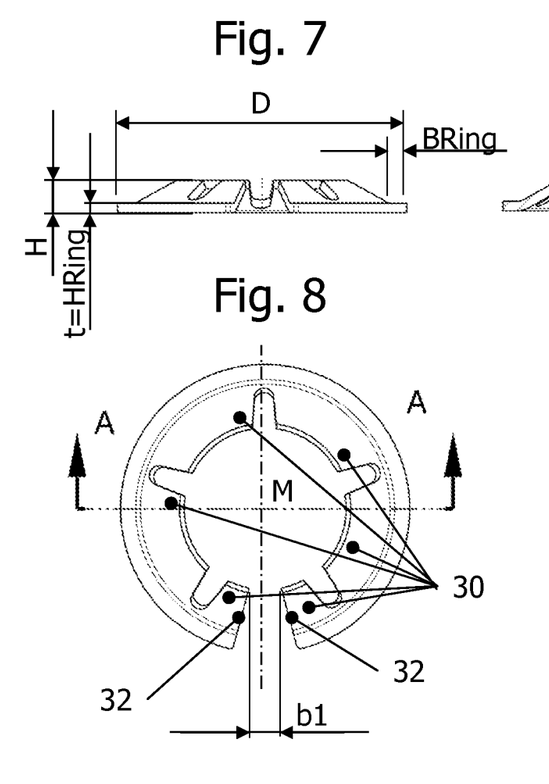
FIGS. 7 and 8 shows the fixing disc in a two-dimensional projected view.
Figure 9:
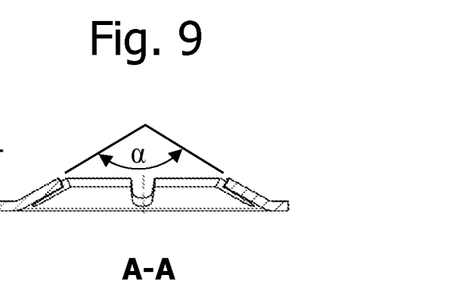
FIG. 9 shows the fixing disc in a two-dimensional sectional view.

Moreover, the fixing disc 20 has a slot 31 cutting through the material thickness t and running from the through-opening 25 to the outer diameter D. In a state of the fixing disc 20 not mounted in the bore 7 and not mounted on the pin 43, the slot 31 has a width b1 measured at the transition with the through-opening 25. In a state of the fixing disc 20 mounted in the bore 7 and mounted on the pin 43, the slot 31 has a width b2 measured at the transition with the through-opening 25. b2 is smaller than b1. In other words, by the installation of the fixing disc 20 in the bore or in the groove 8, the slot width is reduced and the fixing disc 20 is pretensioned, which promotes the clamping action on the pin 43. The slot 31 is of wedge-shaped configuration. The slot edges 32 of the fixing disc 20 are oriented towards one another in a correspondingly wedge-shaped manner and run in each case radially towards the fixing disc central point M. The slot 31 is arranged between two incisions 29, whereby the clamping edge 27 is additionally subdivided.

Figure 10:
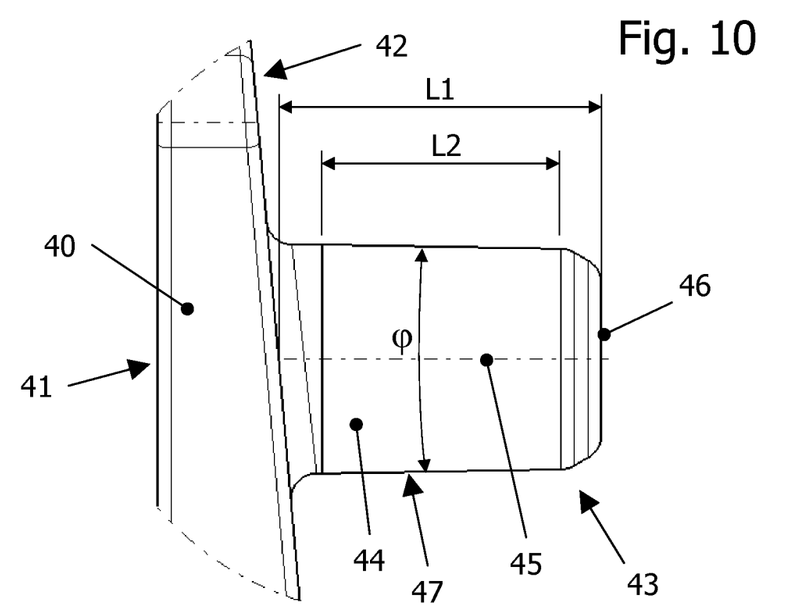
FIG. 10 shows the pin in an enlarged view.

Starting from the bearing side 43, the pin 43 tapers conically towards the pin end 46 in a holding region 47 which extends over a length L2. In this holding region 47, the fixing disc 20, or the clamping edge 27 of the fixing disc 20, has clamping contact with the pin 43 in the assembled state. This conical tapering has the advantage that the components are easier to assemble. That is to say, the pin 43 can thus be more easily pushed through the through-opening 25. Although the pin 43 can be easily inserted first with its pin end 46 into the through-opening 25, a firm fit in the final assembly position of the pin 43 is however obtained on account of the increasing pin diameter. In this way, the clamping portions 30 are also not bent open unnecessarily wide during assembly, e.g. if the assembly takes place with a certain process speed, and instead the clamping portions 30 are not overextended during assembly and thus have the best clamping force in the assembled end position.

The pin 43 has a total length L1. In one exemplary arrangement, the holding region 47 with its length L2 has a lengthwise proportion of the total length L1 of at least 0.7. However, it is also possible that the length ratio of L2 to L1 is at least greater than 0.5 or at least 0.6. In this way, the above-described assembly advantage (easy insertion of the pin end 46, secure retention in the holding region 47 and avoidance of overextension of the clamping portions 30) can be readily achieved.

Seen in a parallel projection, the conically extending flanks of the pin 43 enclose an angle φ. In the present exemplary arrangement, the angle φ is 2°. However, angles of greater than or equal to 1° and less than or equal to 3° are also possible.

The tapering conical shape is particularly suitable in connection with the relatively stiff fixing disc 20 and with the, in relation to the incision width of the incisions 29, relatively wide clamping portions 30 with their clamping edge portions 28, since, through the cone shape of the pin 43, the clamping portions 30 are pressed apart as it were according to the wedge principle, such that a pressing-in of the pin 43 is readily possible.

Figure 2:
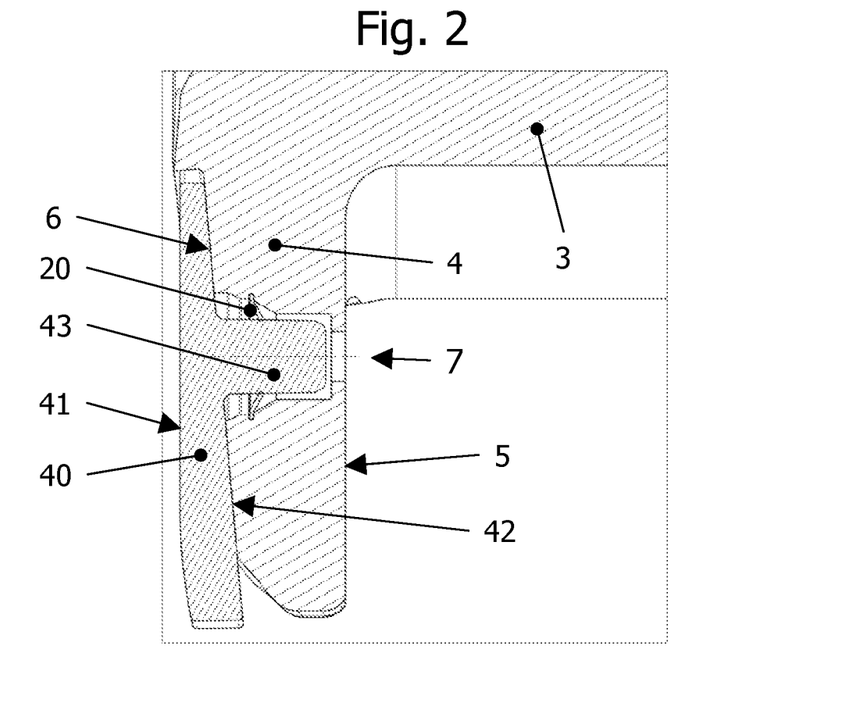
FIGS. 2 and 3 show a bridge finger with the mounted cover in a sectional view.
Figure 3:
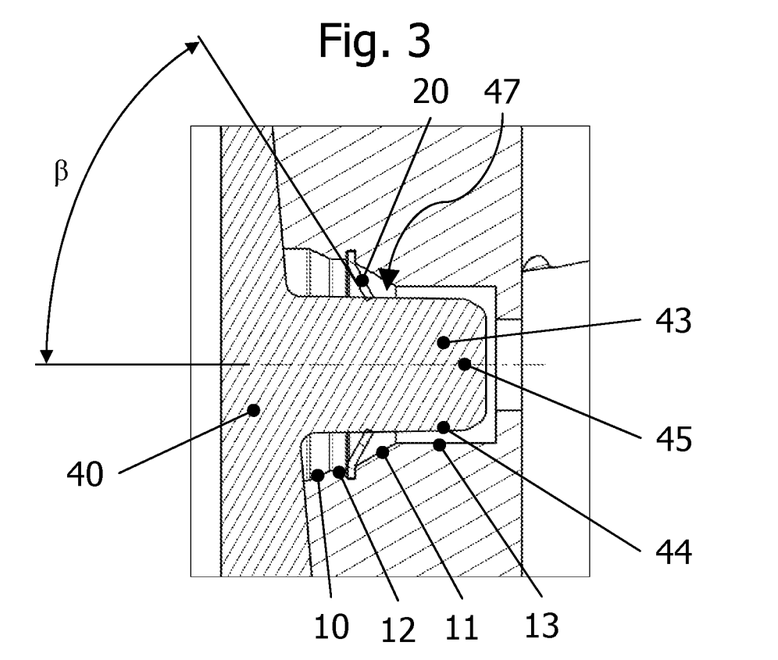
Figure 4:
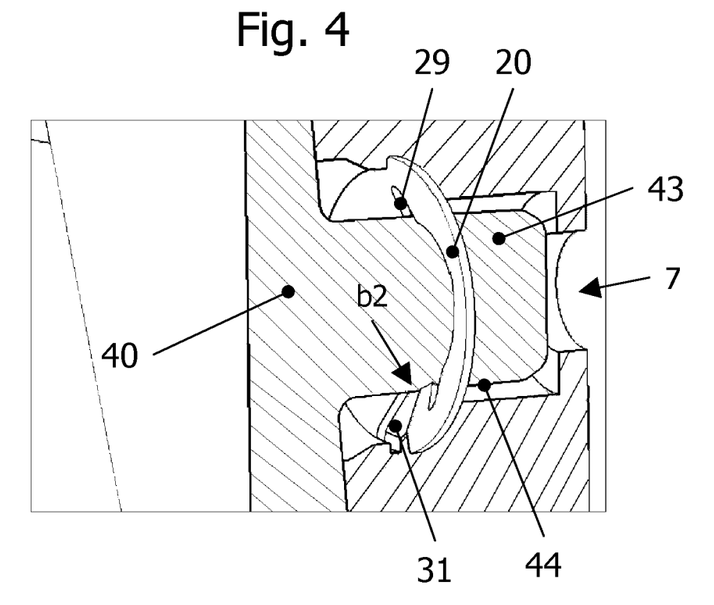
FIG. 4 shows a detail of the pin inserted and fixed in the bore in a perspective sectional view.
Figure 5:
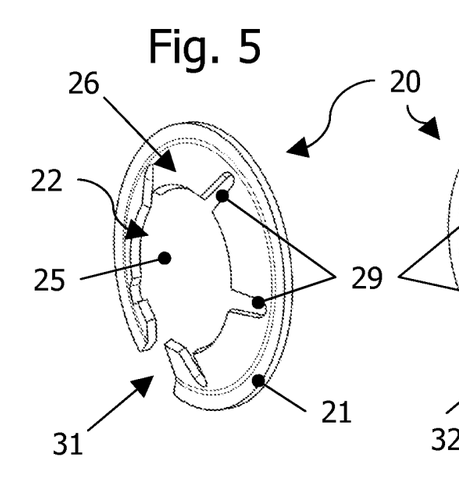
FIGS. 5 and 6 show the fixing disc in a perspective view.
Figure 6:
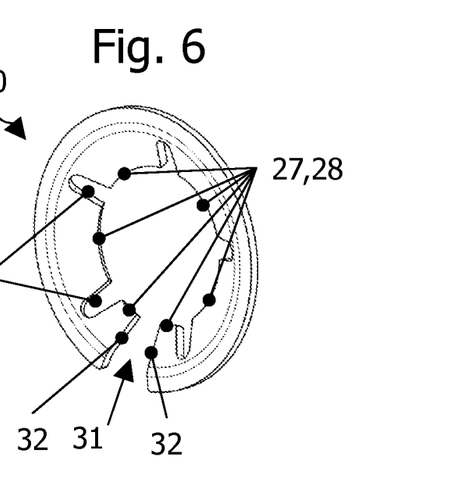

A bore portion 10 in which the bore 7 conically tapers in the direction of the brake lining side 5 is located between the outer side 6 of the bridge fingers 4 and the bore groove 8. A cylindrical bore portion 12 is also located between this tapering 10 and the groove 8. Due to this design, an advantageous mounting situation is produced in order to be able to bring the fixing disc 20 into the latching position in the groove 8. This may be carried out, for example, in a manner such that the fixing disc 20 is forced by the pin 43 into the groove 8 via the tapering bore portion 10. The cylindrical bore portion 12 ensures a sufficient strength of the groove wall 9, which has to provide the required retention counter to the pull-out direction of the pin 43 from the bore 7. By the cylindrical bore portion 12 it is ensured that the relevant groove wall 9 is not weakened in its support surface due to production tolerances. The axial extent of the cylindrical bore portion 12 is slightly smaller than the axial extent of the tapering 10. As a result, it is achieved that the required strength is obtained without having to dispense with the mounting advantage which is provided by the conical portion 10.

A portion 11 in which the bore 7 conically tapers in the direction of the brake lining side 5 is also located between the groove 8 and the brake lining side 5. This tapering 11 protects the fixing disc 20 from the bulged clamping region 26 bending back excessively, or from slipping through in the direction of the brake lining side 5 during mounting. A further cylindrical bore portion 13 in which the pin 43 is received adjoins the tapering 11 in the direction of the braking lining side 5.

The fixing disc 20 is inserted with its disc edge 21 into the bore annular groove 8 of the bore 7 and is positively held in the bore, secured against an axial slippage of the fixing disc 20 out of the bore 7. The fixing disc 20 in this case is inserted into the bore 7 such that the clamping region 26 is bulged in the direction of the brake lining side 5. The pin 43 is inserted in the bore 7 and protrudes through the through-opening 25 of the fixing disc 20. The clamping portions 30 at the same time fixedly clamp the pin 43 to the clamping edge portions 28 and are pressed into the pin circumferential surface 44 of the pin 43. The clamping portions 30 are oriented such that they act in each case obliquely on the pin circumferential surface 44 or are oriented obliquely to the pin longitudinal axis. Due to this orientation, the clamping edges 27 optimally press against or into the pin circumferential surface 44 and prevent a release of the pin 43 and thus also of the cover 40.

A reliable and permanent retention of the cover 40 on the supporting structure 2 or on the bridge fingers 4 is achieved by the above-described construction. Even vibrations do not lead to a release of the cover 40. However, in the presence of vibrations, the clamping edge portions 28 with their clamping edges 27 work their way further into the pin circumferential surface 44 and ensure a reliable captive securing arrangement.

The invention claimed is:

1. A brake calliper for a disc brake, comprising:
a supporting structure with a bridge and at least one bridge finger which has a brake lining side, an outer side and a bore which is incorporated into the outer side and which runs from the outer side in a direction of the brake lining side,
wherein the bore has a groove;
a cover with a pin protruding into the bore,
a fixing disc with a disc edge which has an outer diameter and which is positively held in the groove of the bore and with a disc center which has a through-opening, through which the pin protrudes,
wherein the disc center has a clamping region which is bulged relative to the disc edge in the direction of the brake lining side and which fixedly clamps the pin in the through-opening a clamping edge, and
wherein the bore has between the outer side and the groove, a portion in which the bore tapers in the direction of the brake lining side, and wherein a cylindrical bore portion is present between the tapered and the groove, the axial extent of the cylindrical bore portion being smaller than or equal to an axial extent of the tapered.

2. A brake calliper for a disc brake, comprising:
a supporting structure with a bridge and at least one bridge finger which has a brake lining side, an outer side and a bore which is incorporated into the outer side and which runs from the outer side in a direction of the brake lining side,
a cover with a pin protruding into the bore,
a fixing disc with a disc edge which has an outer diameter and which is positively held in the bore and with a disc center which has a through-opening, through which the pin protrudes,
wherein the disc center has a clamping region which is bulged relative to the disc edge in the direction of the brake lining side and which fixedly clamps the pin in the through-opening a clamping edge,
wherein the bore has a groove in which the disc edge engages and wherein the bore has between the groove and the brake lining side, a portion in which the bore tapers in the direction of the brake lining side.

3. The brake calliper according to claim 2, wherein the bore has between the outer side and the groove a portion in which the bore tapers in the direction of the brake lining side.

4. The brake calliper according to claim 2, wherein the fixing disc has a material thickness which extends from a first side to a second side of the fixing disc, and
wherein the fixing disc has a height which is larger than the material thickness due to the bulged clamping region.

5. The brake calliper according to claim 4, wherein the bulged clamping region has a shape of a hollow truncated cone, wherein in a state of the fixing disc not mounted in the bore and not mounted on the pin, the cone opening angle α is between 100° and 140°, and wherein the disc edge is configured in an annular manner between the outer diameter and the bulged clamping region with a height which is equal to the material thickness.

6. The brake calliper according to claim 4,
wherein the fixing disc has a wedge-shaped slot cutting through the material thickness and passing through from the through-opening to the outer diameter,
wherein in a state of the fixing disc not mounted in the bore and not mounted on the pin, the slot has a first width measured at the transition with the through-opening,
wherein in a state of the fixing disc mounted in the bore and mounted on the pin, the slot has a second width measured at the transition with the through-opening, and wherein the second width is smaller than the first width.

7. The brake calliper according to claim 6,
wherein the slot is arranged in the profile of a clamping edge portion and cuts through the latter.

8. The brake calliper according to claim 2,
wherein starting from the through-opening at least one incision running in a direction of the disc edge, cuts into the bulged clamping region,
wherein the incision along the clamping edge forms an interruption portion which extends over a first angle and a clamping edge portion which extends over a second angle,
wherein the second angle is greater than the first angle,
wherein vertices of the angles first and second angles in each case lie in the disc centre.

9. The brake calliper according to claim 8,
wherein a plurality of incisions are present, as a result of which there are a plurality of interruption portions, and a plurality of clamping edge portions.

10. The brake calliper according to claim 9,
wherein, starting from the through-opening, a width of the incisions decreases in the direction of the disc edge.

11. The brake calliper according to claim 10,
Wherein a deepest point of the incisions has a semicircular shape.

12. The brake calliper according to claim 8, wherein the second angle is at least twice as great as the first angle.

13. The brake calliper according to claim 12, wherein a material of the pin, is softer than a material of the the clamping edge.

14. The brake calliper according to claim 2, wherein the bore has between the groove and the brake lining side, a portion in which the bore tapers in the direction of the brake lining side, and wherein this tapered portion directly adjoins the groove.

15. The brake calliper according to claim 2, wherein the fixing disc has a material thickness which extends from a first side to a second side of the fixing disc, and
wherein the fixing disc has a height which is larger than the material thickness due to the bulged clamping region.

16. The brake calliper according to claim 2, wherein a material of the pin is softer than a material of the clamping edge.

17. A brake calliper for a disc brake, comprising:
a supporting structure with a bridge and at least one bridge finger which has a brake lining side, an outer side and a bore which is incorporated into the outer side and which runs from the outer side in a direction of the brake lining side,
a cover with a pin protruding into the bore,
a fixing disc with a disc edge which has an outer diameter and which is positively held in the bore and with a disc center which has a through-opening, through which the pin protrudes,
wherein the disc center has a clamping region which is bulged relative to the disc edge in the direction of the brake lining side and which fixedly clamps the pin in the through-opening a clamping edge,
wherein, starting from a bearing side, the pin tapers, towards a pin end in a holding region which extends over a length, wherein the pin has a total length,
wherein the holding region has a greatest lengthwise proportion of the total length, and
wherein a length ratio of the length to total length is greater than 0.5.

\* \* \* \* \*